Figure 1:
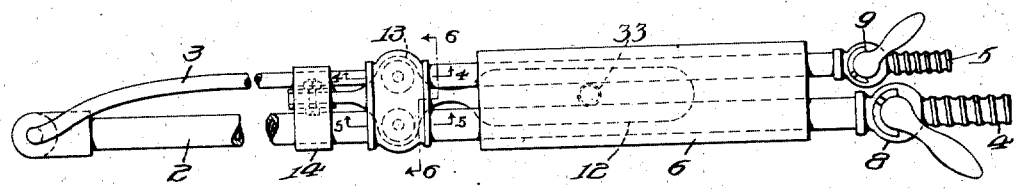

J. G. WALLACE.
TORCH.
APPLICATION FILED JUNE 2, 1916.

1,233,423.

Patented July 17, 1917.

WITNESS
F. J. Hartman.

INVENTOR
John G. Wallace
BY Fenton & Blount
ATTORNEYS

UNITED STATES PATENT OFFICE.

JOHN G. WALLACE, OF PHILADELPHIA, PENNSYLVANIA.

TORCH.

1,233,423.  Specification of Letters Patent.  Patented July 17, 1917.

Application filed June 2, 1916.  Serial No. 101,239.

*To all whom it may concern:*

Be it known that I, JOHN G. WALLACE, a citizen of the United States, and a resident of the city of Philadelphia, county of Philadelphia, and State of Pennsylvania, have invented certain new and useful Improvements in Torches, of which the following is a specification, reference being had to the accompanying drawing.

My invention relates more especially to torches employed for welding and the like, in which means are provided for separately conveying suitable gases, such as acetylene and oxygen, to a burner in which the gases are mixed preparatory to ignition adjacent the burner tip. In practice it is customary, when employing a torch of this character, to first turn on the acetylene, and after the same has been ignited, to turn on the oxygen, and thereafter regulate the quantities or proportions of both gases delivered at the burner by suitable controlling valves or other means in such manner that a flame of the desired intensity is produced. This regulation of the gases is a matter requiring considerable skill and an appreciable amount of time, and in consequence after the desired adjustment is obtained under any given set of working conditions, it is advantageous to maintain the same until the particular job upon which the workman may be employed is completed. In case the workman is temporarily called away from the job, or desires to lay down the torch during the course of the welding or other operation, the gases must either be shut off completely from the torch thus involving reignition and regulation thereof after the workman is ready to resume work, or else the torch must be laid aside with the intensely hot flame burning at full height, involving a large waste of gas as well as the danger of fire or injury to employees.

A principal object of my invention, therefore, is to provide in a torch of this character means whereby, should the workman or operator lay the torch aside after the same has been ignited and adjusted to produce the desired flame, the amount of gases flowing to the burner will be substantially cut off to reduce the size and temperature of the flame until the operator again picks up the torch, which action shall automatically result in reëstablishing the flow of gases to the burner in the same quantity and proportion as when the torch was laid aside; and to provide means to prevent the total extinguishment of the torch when the same is laid aside, whereby the necessity of reigniting the torch after the full flow of gases to the burner is reëstablished is avoided.

Further objects of my invention are to provide means suitable for the purposes heretofore described which may be readily adapted for use in torches of the types at present in use; which shall be cheap to construct and which shall therefore not add materially to the cost of the torch; which shall comprise a relatively small number of parts; which shall be simple in construction and not liable to get out of order when in use; which shall operate substantially automatically in reducing the flow of gas when the torch is laid aside and in permitting a resumption of the flow thereof when the torch is again picked up, and which shall not interfere with the working or operation of the torch in any manner whatsoever.

My invention further includes all of the various other objects and novel features of construction and arrangement hereinafter more definitely specified and described.

Figure 2:
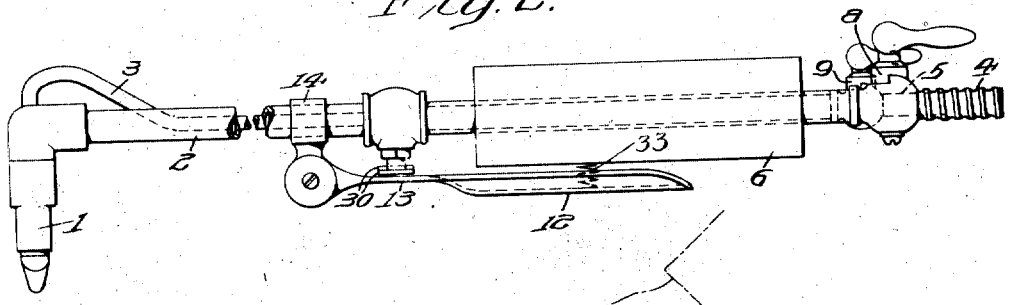
Figure 3:
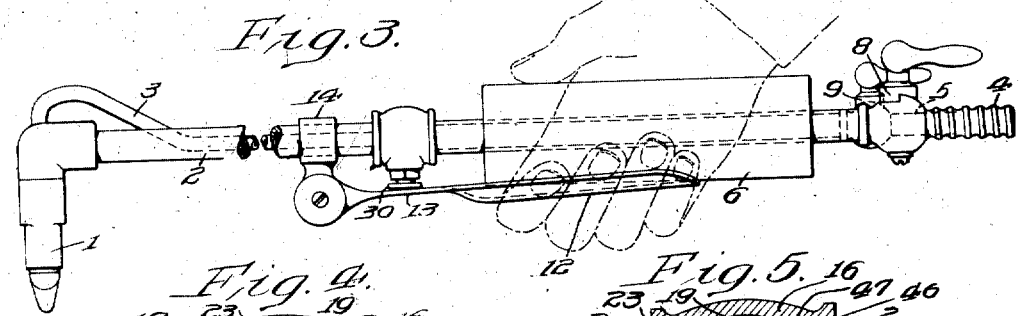
Figure 4:
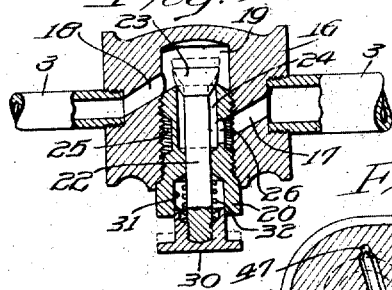
Figure 5:
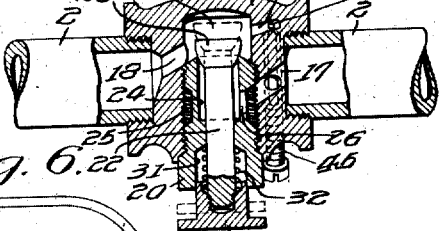
Figure 6:
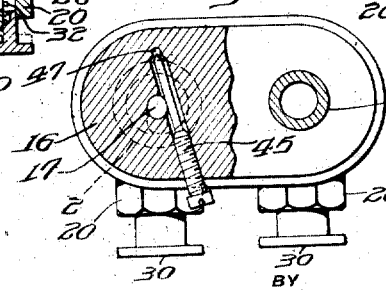

In the accompanying drawing in which is illustrated a preferred embodiment of my invention applied to a torch of substantially standard form, Figure 1 is a top plan view thereof; Fig. 2 a side elevation showing the parts in the position assumed when the torch is not in operative use, and Fig. 3 is a similar view illustrating the position of the parts when the torch is in operative use. Figs. 4 and 5 are respectively fragmentary enlarged vertical sections taken on the lines 4—4 and 5—5 in Fig. 1, and Fig. 6 is an enlarged view, partially in elevation and partially in section, taken on line 6—6 in Fig. 1, looking in the direction of the arrows.

The form of the invention illustrated is shown as applied to an ordinary oxy-acetylene torch adapted for welding and the like comprising the burner 1 and pipes 2 and 3 by means of which acetylene and oxygen may be respectively conducted to the burner from suitable separate tanks, not shown; to which the pipes are connected by flexible tubing, or otherwise, in the well known manner, nipples 4 and 5 being supplied to facilitate the connection of the tubing with the pipes. The pipes are surrounded by a suitable handle 6 which is grasped by the operator when using the torch, and both pipes may, if desired, be provided with regulating valves 8 and 9 or other suitable means by which the quantity of gas passing through the pipes from the tanks, and hence to the burner, may be adjusted. It is thought the construction and operation of the torch will be familiar to those skilled in the art without further description.

For the purpose of automatically controlling the flow of gas through the pipes in such manner that the same shall be reduced or entirely cut off except when the torch is in actual use, even though the regulating valves 8 and 9 be opened, I provide suitable preferably separate valves interposed between the regulating valves and the burner and arrange for the actuation thereof by suitable means preferably so positioned as to function through the action of the hand of the operator when grasping the torch preparatory to using the same. While the valves may be of any suitable or desired construction I prefer to form them substantially as hereinafter described and to actuate them by means of a hinged lever 12 having a transversely extending plate or portion 13, which lever may conveniently be pivoted to a suitable clip 14 rigidly secured to the pipes 2 and 3, in such manner as to normally extend parallel to and beneath the handle 6 so that when the latter is grasped by the operator his fingers are instinctively close around the lever and draw the same up toward the handle, as shown in Fig. 3.

While the valves for controlling the flow of gases may be of any suitable form I prefer to dispose them in a single housing 16 which may be located in front of the handle 6, that is, between the handle and the burner, both valves being preferably of substantially similar construction. For convenience of description I shall first refer to the valve controlling the flow of oxygen in the pipe 3, hereinafter called the "oxygen valve," which is best illustrated in Fig. 4, it being understood that corresponding parts of the valve controlling the flow of acetylene in pipe 2, hereinafter referred to as the "acetylene valve," and which is best illustrated in Fig. 5, are designated by similar numbers.

Referring now more especially to the oxygen valve, the housing 16 adjacent the valve is suitably bored and threaded for the reception of the ends of the pipe 3 and provided with a pair of ports 17 and 18 leading from the respective ends of the pipe to a central chamber 19 formed in the housing and open at its lower end. The chamber is internally threaded and arranged for the reception of an externally threaded bushing 20 which screws into the chamber and provides a guide for the movable valve stem 22 carrying the mushroom-shaped valve head 23 which is arranged to seat upon that end of the bushing projecting in the chamber, the interior of the bushing surrounding the valve stem being bored out to form an enlarged passage 24. Adjacent the end of the port 17 the bushing is reduced in diameter so that an annular space 25 is provided between the housing and the exterior of the bushing and a port 26 is provided connecting this space with the passage 24. It will thus be evident that gas may readily pass from pipe 3 through port 17 to space 25 and thence through port 26 to the passage 24 from which its exit is prevented when the valve head 23 seats against the end of the bushing and closes the mouth of the passage.

For the purpose of normally maintaining the valve head against its seat upon the end of the bushing suitable means are provided which, in the form of the invention illustrated, comprise a cap 30 threaded or otherwise secured on the end of the valve stem with its upper extremity projecting into a cylindrical chamber 31 in the outer extremity of the bushing in which a suitable spring 32 may be disposed and arranged to press against the end of the chamber and against the cap in such manner as to normally force the cap, and hence the valve stem 22 and head 23 downwardly with respect to the bushing to seat the head against its upper extremity.

The acetylene valve in the pipe 2 may preferably be in all respects substantially similar to the valve just described except that as it is customary to form the acetylene pipe of greater diameter than the oxygen pipe, the openings for the reception of the ends of the pipe in the housing will necessarily be somewhat greater in diameter than those designed for the reception of the oxygen pipe. In adjusting the relative relation of the cap and valve stem, however, in the acetylene valve, the former is so arranged for a purpose to be hereinafter described that its lower face or extremity will lie in a plane slightly below the horizontal plane of the lower face or extremity of the cap of the oxygen valve.

With the parts formed and assembled as hereinbefore described, it will be evident that the valve heads 23 when seated will prevent the passage of any gas from the source of gas supply through either pipe to the burner irrespective of the positions of the regulating valves 8 and 9, and that when the handle 6 of the torch is grasped by the operator, as shown in Fig. 3, the fingers will instinctively close around the lever 12 and drawing the same upwardly toward the handle will cause the transversely extending plate 13 to contact with the lower extremities of the caps 30, the continued movement of the lever forcing the caps upwardly and in turn raising the valve heads from their seats to assume substantially the positions shown in dotted lines in Figs. 4 and 5. The gases may now be turned on at valves 8 and 9 and the torch ignited and adjusted in the usual manner, the operator, of course, continuously holding lever 12 adjacent handle 6. As soon, however, as he releases his grasp on the handle and lever, the latter, owing to the action of springs 32, supplemented by a suitably positioned spring 33, if desired, tends to return to the position shown in Fig. 2, thus permitting the oxygen and acetylene valves to close and cutting off the passage of gas past those valves to the burner, which action would result in completely extinguishing the torch in the absence of means to prevent this result and hereinafter described It will be evident, owing to the lead of the acetylene valve over the oxygen valve due to its cap 30 being adjusted to a position slightly below the corresponding cap of the oxygen valve, that the acetylene valve will open slightly before and close slightly after, the oxygen valve during the movement of lever 12, and that it will open for a slightly greater distance, thus establishing the flow of acetylene to the burner slightly in advance of the flow of oxygen, and maintaining it for a slightly greater period of time.

To obviate the complete extinguishment of the torch when the valve heads 23 seat upon the ends of their respective bushings, however, means are provided to permit a constant, but a relatively minute flow of acetylene to the burner, and in the form of the invention shown comprise a suitable needle valve 45 threaded into the housing 16 and controlling a small passage 46 extending through the body of the housing from the port 17 to a chamber 47 communicating with the main chamber 19 and hence through port 18 and pipe 2 with the burner. It will be observed that the flow of gas past the needle valve and through passage 46 is entirely independent of the position and operation of the adjacent valve head 23 and its actuating mechanism, thus permitting a small but constant stream of gas to pass to the burner sufficient to maintain a small flame or pilot light of pure acetylene gas adjacent the tip thereof at all times after the torch is once ignited and as long as the valve 8 is not completely closed. Whenever the lever 12 is manipulated to open the main acetylene valve the pilot flame will of course immediately increase in size and if the movement of the lever be continued sufficiently to open the oxygen valve, this flame will then be reinforced by the blast of oxygen in the well known manner.

In consequence, whenever the torch after being ignited and properly adjusted is temporarily laid aside, it is unnecessary to extinguish it or to change the position of the main regulating valves and thus vary the predetermined proportions of acetylene and oxygen for when pressure on the lever 12 is released the oxygen valve immediately closes, closely followed by the acetylene valve, and the torch thereafter burns with a small pure acetylene flame fed by the gas passing the needle valve 46. As soon as the torch is again picked up to continue the work of welding or the like, the acetylene and oxygen valves consecutively open to reestablish the flow of both gases to the burner in the relative proportions determined when the torch was initially ignited.

While I have referred to and illustrated my invention in connection with a usual form of torch adapted for the use of acetylene and oxygen gases, it will be understood that the invention is equally well adapted for employment in connection with torches or the like arranged to utilize other gases or fluids and of varying constructions, and furthermore, that while I have illustrated and described a preferred embodiment of my invention with considerable particularity, I do not intend or desire to thereby limit myself specifically thereto, as it will be evident that suitable changes and modifications may be made in the form, arrangement and construction of the various parts as desired without departing from the spirit and scope of the invention as defined in the appended claims.

Having thus fully described my invention, I claim and desire to protect by Letters Patent of the United States:

1. The combination with a torch having a pair of pipes adapted to separately conduct gases to a burner, means for regulating the flow of gases in said pipes and a handle, of an independently movable valve disposed in each of said pipes and normally operative to prevent a flow of gas therethrough, a hinged lever adjacent said handle and adapted to automatically consecutively open said valves when said handle and said lever are simultaneously grasped by the operator of the torch and means to permit a constant flow of gas to said burner through one of said pipes independently of the position of the valve in such pipe.

2. The combination with an oxy-acetylene torch having a pair of pipes adapted to convey gases to a burner, means for regulating the flow of said gases and a handle, of a valve in each of said pipes, means to maintain said valves in normally closed position, means operative to automatically open said valves consecutively as said means and said handle are grasped by the operator, and means comprising an adjustable needle valve operative to maintain a constant flow of acetylene to said burner independently of the position of the valves in said pipes.

3. The combination with an oxy-acetylene torch having a burner and pipes operative to conduct the gases thereto, of a valve interposed in each pipe and normally operative to prevent the passage of gas therethrough, a lever operative to automatically actuate said valves when the torch is grasped by the operator, means to cause the valve in one pipe to open in advance of the valve in the other pipe when said valves are actuated by said lever, and means to permit a constant flow of acetylene to said burner independently of the position of the valve in the pipe carrying the acetylene.

4. The combination with an oxy-acetylene torch having a burner, pipes operative to conduct gases to said burner and gas regulating means, of a valve interposed in each pipe between said regulating means and said burner and normally operative to prevent the passage of gas thereto, means operative to automatically consecutively open said valves to permit the passage of gas through one of said pipes to said burner in advance of the passage of gas through the other of said pipes thereto when the torch is grasped by the operator, and means to permit the constant passage of a relatively small quantity of acetylene from said regulating means to said burner independently of the position of either of said valves.

In witness whereof, I have hereunto set my hand this 29th day of May, 1916.

JOHN G. WALLACE.